US012569878B2

(12) United States Patent
Futaba

(10) Patent No.: US 12,569,878 B2
(45) Date of Patent: Mar. 10, 2026

(54) PLATED STEEL SHEET

(71) Applicant: NIPPON STEEL CORPORATION, Tokyo (JP)

(72) Inventor: Takashi Futaba, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/699,629

(22) PCT Filed: Oct. 19, 2022

(86) PCT No.: PCT/JP2022/038958
§ 371 (c)(1),
(2) Date: Apr. 9, 2024

(87) PCT Pub. No.: WO2023/068303
PCT Pub. Date: Apr. 27, 2023

(65) Prior Publication Data
US 2024/0399414 A1 Dec. 5, 2024

(30) Foreign Application Priority Data
Oct. 19, 2021 (JP) ................................ 2021-170785

(51) Int. Cl.
*B05D 7/00* (2006.01)
*B05D 7/14* (2006.01)

(52) U.S. Cl.
CPC ................ *B05D 7/14* (2013.01); *B05D 7/58* (2013.01); *B05D 2202/10* (2013.01)

(58) Field of Classification Search
CPC ........................................................ B05D 7/14
See application file for complete search history.

(56) References Cited

U.S. PATENT DOCUMENTS

2012/0219823 A1 8/2012 Myers
2020/0141019 A1* 5/2020 Futaba .................... C23C 30/00

FOREIGN PATENT DOCUMENTS

JP 2006-124824 A 5/2006
JP 2013-536901 A 9/2013

* cited by examiner

*Primary Examiner* — Ian A Rummel
(74) *Attorney, Agent, or Firm* — Renner, Otto, Boisselle & Sklar, LLP.

(57) ABSTRACT

A protective film of a plated steel sheet is formed on a plating layer that has a texture on its surface. The protective film contains a binder resin and a plurality of resin particles. The surface of the protective film includes a flat portion, and a plurality of convex portions formed by a part of the resin particles protruding from the flat portion. An average film thickness d of the protective film is 10.0 μm or less. A total area fraction S of a plurality of the convex portions when the surface of the protective film is seen in plan view is 10.0% or less. F1 defined by Formula (1) is 10.0 or more, and F2 defined by Formula (2) is 0.7 to 3.0.

$$F1 = D \times S \quad (1)$$

$$F2 = D/d \quad (2)$$

where, in Formulae, an average particle diameter D (μm) of the resin particles is substituted for “D”.

4 Claims, 6 Drawing Sheets

PLATED STEEL SHEET

TECHNICAL FIELD

The present invention relates to a plated steel sheet, and more particularly relates to a plated steel sheet having a texture on the surface of a plating layer.

BACKGROUND ART

In some cases, products such as building materials, automobiles, and electrical machinery and apparatuses may be required to have a design property. Methods that are used for enhancing the design property of a product are to apply a coating to a surface of the product, and to affix a film to a surface of the product.

Recently, there is a tendency to favor materials which make use of the texture of metal, especially in Europe and the United States where many people are nature oriented. In the case of making use of the texture of metal, stainless steel sheets or aluminum sheets, which are materials that are excellent in corrosion resistance even when left uncoated, are used as a starting material. In addition, to further express the metallic feeling of stainless steel sheets and aluminum sheets, stainless steel sheets and aluminum sheets having a texture typified by hairlines formed on the surface thereof are also being provided. However, stainless steel sheets and aluminum sheets are expensive. Therefore, there is a need for inexpensive materials that can be used in place of stainless steel sheets and aluminum sheets.

Plated steel sheets having a plating layer on the surface have been developed as one kind of alternative material to be used in place of such stainless steel sheets or aluminum sheets. Similarly to a stainless steel sheet or an aluminum sheet, a plated steel sheet has appropriate corrosion resistance and is also excellent in workability. Therefore, plated steel sheets are suitable for uses such as building materials. Therefore, various proposals have been made with the objective of enhancing the design properties of plated steel sheets.

For example, in a technique disclosed in Japanese Patent Application Publication No. 2006-124824 (Patent Literature 1), a galvanized steel sheet is provided with a hairline finish. Thereafter, a transparent resin coating is formed on the surface of a galvanized layer on which hairlines have been formed. By this means, while maintaining the corrosion resistance, the design property is enhanced by making the surface of the plating layer visible through the transparent resin coating.

Further, in a technique disclosed in Japanese Translation of PCT International Application Publication No. 2013-536901 (Patent Literature 2), a galvanized steel sheet is subjected to rolling to form a texture on the surface of a galvanized layer. Thereafter, the surface of the galvanized layer on which the texture has been formed is coated with an organic film (resin) so as to cause the surface roughness to fall within a certain range. By this means, while maintaining corrosion resistance, the design property is enhanced by making the surface of the plating layer visible through the organic film.

CITATION LIST

Patent Literature

Patent Literature 1: Japanese Patent Application Publication No. 2006-124824

Patent Literature 2: Japanese Translation of PCT International Application Publication No. 2013-536901

SUMMARY OF INVENTION

Technical Problem

In this connection, plated steel sheets to be utilized for uses such as building materials are formed into predetermined shapes by processing typified by press working or the like. In press working or the like, a die contacts the surface of the plated steel sheet. In some cases, scratches are imparted to the surface of the plated steel sheet due to such contact with a die. In addition, in some cases, during cutting after press working, burrs are generated at end parts of the plated steel sheet, or swarf such as iron powder is produced. In some cases, scratches are also imparted to the surface of the plated steel sheet that are caused by such burrs or swarf.

The textured plated steel sheets which have a resin coating formed on the surface that are proposed in the Patent Literatures 1 and 2 described above may also in some cases be subjected to processing typified by press working and the like or to cutting. Therefore, also in these plated steel sheets, it is preferable that the occurrence of scratches during processing and cutting is suppressed. In other words, there is a need for these plated steel sheets to have excellent scratch resistance.

In addition, in the case of a plated steel sheet on which a texture is formed, there is a need for the texture to be visible. Therefore, a plated steel sheet on which a texture is formed is required to not only be excellent in scratch resistance, but also to be excellent with regard to the visibility of the texture.

An objective of the present invention is to provide a plated steel sheet that is excellent in texture visibility and scratch resistance.

Solution to Problem

A plated steel sheet according to the present invention includes:

a base-metal steel sheet, a plating layer formed on a surface of the base-metal steel sheet, and having a texture on a surface, and a protective film that is formed on the surface of the plating layer, wherein, the protective film contains:

a binder resin, and a plurality of resin particles;

a surface of the protective film includes:

a flat portion, and a plurality of convex portions formed by a part of a plurality of the resin particles protruding from the flat portion;

an average film thickness d of the protective film is 10.0 μm or less;

a total area fraction S of a plurality of the convex portions when the surface of the protective film is seen in plan view is 10.0% or less;

F1 defined by Formula (1) is 10.0 or more; and
F2 defined by Formula (2) is 0.7 to 3.0;

$$F1 = D \times S \quad (1)$$

$$F2 = D/d \quad (2)$$

where, in Formula (1) and Formula (2), an average particle diameter D (μm) of a plurality of the resin particles is substituted for "D", the total area fraction S (%) of a plurality of the convex portions is substituted for "S", and the average film thickness d (μm) of the protective film is substituted for "d".

Advantageous Effects of Invention

The plated steel sheet according to the present disclosure is excellent in texture visibility and scratch resistance.

DESCRIPTION OF EMBODIMENT

The present inventors conducted studies which focused on achieving both texture visibility and scratch resistance in a plated steel sheet including a plating layer having a texture on the surface, and a protective film formed on the plating layer. As a result, the present inventors obtained the following findings.

In order to increase the scratch resistance provided by a protective film, a plurality of resin particles are included in a binder resin of the protective film. In addition, a part of a plurality of the resin particles protrudes from a flat portion of the protective film to form a plurality of convex portions at the surface of the protective film.

In this case, during processing typified by press working and the like, a die contacts a plurality of convex portions that are constituted by a plurality of resin particles. The convex portions (resin particles) come in contact with the die, and thus contact between the binder resin constituting the flat portion of the surface of the protective film and the die is suppressed. In addition, because burrs and swarf that are produced by cutting also contact the plurality of convex portions, contact between the binder resin constituting the flat portion of the surface of the protective film and the burrs and swarf is suppressed. As a result, the occurrence of scratches at the binder resin constituting the flat portion is suppressed.

Based on the technical idea described above, if a plurality of resin particles are contained in a protective film so as to form a plurality of convex portions, the scratch resistance will be enhanced. However, it has been revealed that when the total area fraction of a plurality of convex portions at the surface of a protective film increases, the visibility of a texture formed on the surface of the plating layer decreases.

Therefore, the present inventors investigated the relation between the total area fraction of convex portions and the visibility of the texture. First, the present inventors investigated the relation between the visibility of the texture and the glossiness. As a result, the present inventors found that the visibility of the texture has a positive correlation with the glossiness.

Figure 1:
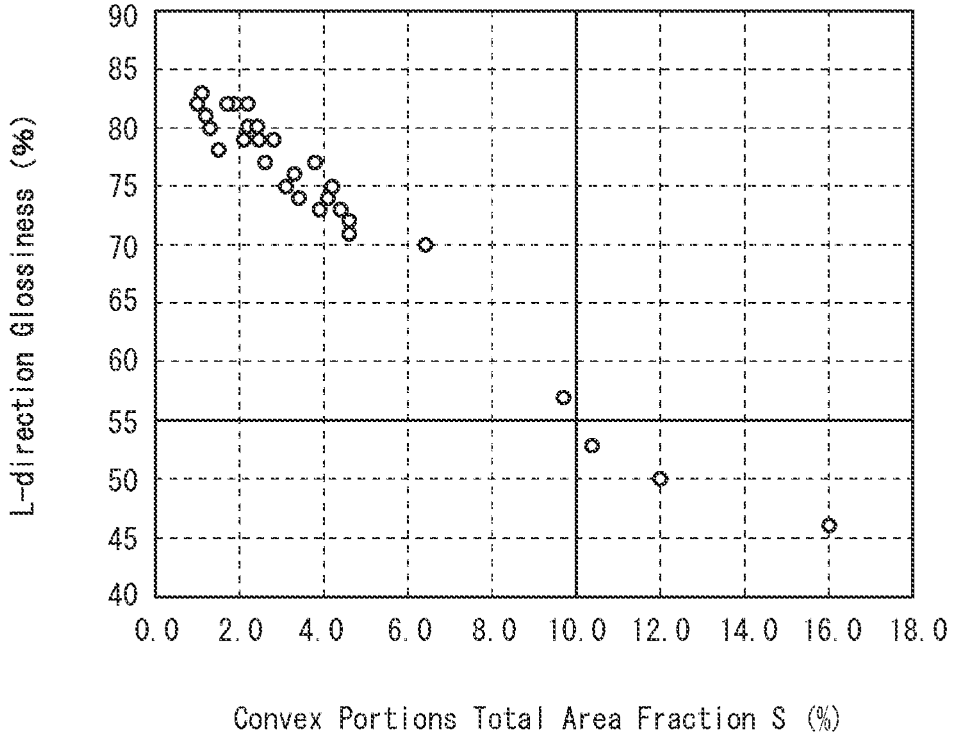
FIG. 1 is a view illustrating the relation between a total area fraction of convex portions, and glossiness in the rolling direction of a plated steel sheet.

Hence, the present inventors conducted further studies regarding the relation between the total area fraction of convex portions and the glossiness (that is, texture visibility). Hereinafter, the total area fraction of convex portions is also referred to as "convex portions total area fraction S". The glossiness was determined in accordance with Specular glossiness-Methods of measurement (JIS Z 8741:1997) that is described in Examples to be described later. The results of the studies are shown in FIG. 1. The abscissa in FIG. 1 represents the convex portions total area fraction S (%). The method for measuring the convex portions total area fraction S is described later. The ordinate in FIG. 1 represents the 60° glossiness (%) in the rolling direction (L direction) of the steel sheet. The method for measuring the glossiness is described later.

Referring to FIG. 1, it has been revealed that the convex portions total area fraction S and the texture visibility exhibit a negative correlation. Specifically, referring to FIG. 1, as the convex portions total area fraction S increases, the 60° glossiness in the L direction decreases. In other words, the larger the convex portions total area fraction S is, the lower the visibility of the texture becomes. Therefore, the present inventors considered that, in order to increase the texture visibility, it is necessary to suppress the convex portions total area fraction S to a certain extent.

On the other hand, the larger the convex portions total area fraction S is, the greater the degree to which contact between a die and the binder resin of the protective film is suppressed during processing, and the greater the degree to which contact between burrs or swarf after cutting and the binder resin of the protective film is suppressed. It is considered that, as a result, the scratch resistance increases. Therefore, at first glance, the texture visibility and the scratch resistance seemed to be characteristics that are incompatible with each other.

Hence, the present inventors conducted further studies regarding means for increasing the scratch resistance while also suppressing the convex portions total area fraction S to a certain extent to maintain the texture visibility. Here, the present inventors considered that the scratch resistance is influenced not only by the convex portions total area fraction S, but also by an average particle diameter D of the resin particles constituting the convex portions. It is considered that, for the same convex portions total area fraction S, the larger the average particle diameter D of the resin particles is, the greater the height of the convex portions will be. The greater the height of the convex portions is, the greater the extent to which contact between the die and the binder resin of the protective film can be suppressed. On the other hand, even when the average particle diameter D of the resin particles is large, the influence on glossiness is extremely small. Therefore, even if the average particle diameter D of the resin particles increases, the influence on the texture visibility is extremely small.

Based on the technical idea described above, the present inventors investigated the relation between F1 defined by Formula (1), and scratch resistance. Specifically, the present inventors created FIG. 2 based on results obtained with respect to plated steel sheets for which F2 was 0.7 to 3.0 among the entire results of a scratch resistance evaluation test described in Examples which are described later. The abscissa in FIG. 2 represents F1 that is defined by Formula (1).

$$F1 = D \times S \quad (1)$$

Here, in Formula (1), the average particle diameter D of a plurality of the resin particles (μm) is substituted for "D", and the convex portions total area fraction S (%) is substituted for "S". The ordinate in FIG. 2 represents a scratch rating that is an index of scratch resistance. A lower scratch rating indicates lower scratch resistance, and a higher scratch rating indicates better scratch resistance.

Figure 2:
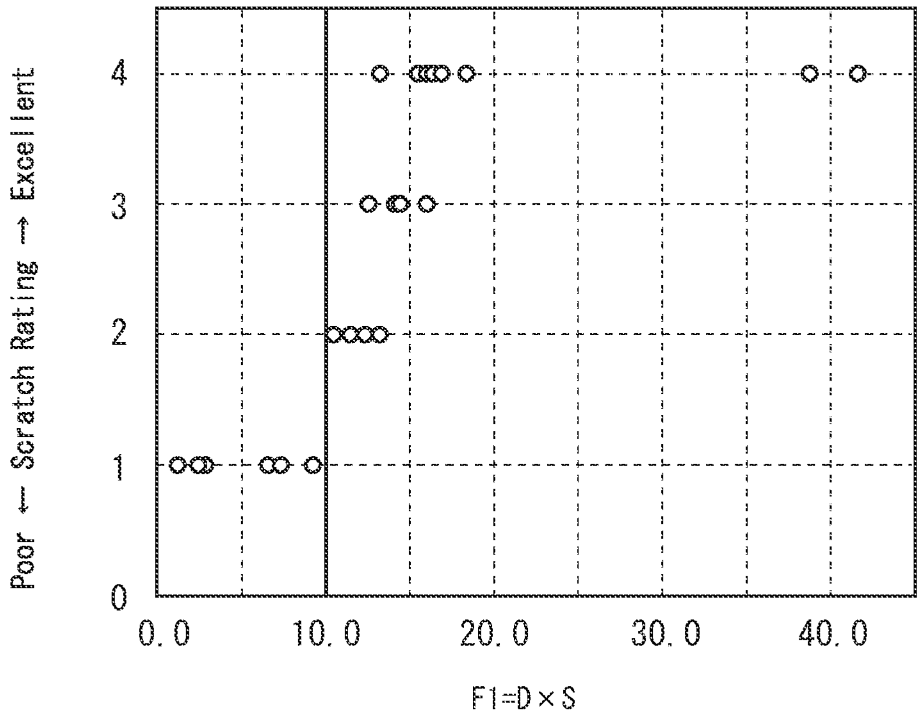
FIG. 2 is a view illustrating the relation between scratch resistance and F1 that is the product of an average particle diameter D of resin particles and a convex portions total area fraction S in a protective film of a plated steel sheet.

Referring to FIG. 2, when F1 is less than 10.0, even if F1 increases, the scratch resistance remains low (remains a scratch rating of 1). On the other hand, in a case where F1 is 10.0 or more, as F1 increases, the scratch resistance markedly increases (the scratch rating markedly rises).

Based on FIG. 1 and FIG. 2, in a plated steel sheet that has a protective film and a texture, by suppressing the convex portions total area fraction S to a certain extent, the scratch resistance can be increased by increasing F1, while maintaining the texture visibility.

Based on the above findings, in addition, the present inventors adjusted the average film thickness d of the protective film, the convex portions total area fraction S, and the average particle diameter D of the resin particles so that these values had an appropriate relation with each other. As a result, the present inventors discovered that if a plated steel sheet satisfies the following characteristic 1 to characteristic 4, both excellent texture visibility and excellent scratch resistance can be achieved.

(Characteristic 1) Average film thickness d of protective film is 10.0 μm or less.

(Characteristic 2) Total area fraction S of convex portions is 10.0% or less.

(Characteristic 3) F1 defined by Formula (1) is 10.0 or more.

(Characteristic 4) F2 defined by Formula (2) is 0.7 to 3.0.

$$F1 = D \times S \quad (1)$$

$$F2 = D/d \quad (2)$$

where, in Formula (1) and Formula (2), the average particle diameter D (μm) of resin particles is substituted for "D", the total area fraction S (%) of convex portions is substituted for "S", and the average film thickness d (μm) of the protective film is substituted for "d".

The gist of the plated steel sheet of the present embodiment, which has been completed based on the technical idea described above, is as follows.

[1]

A plated steel sheet, including:

a base-metal steel sheet, a plating layer formed on a surface of the base-metal steel sheet, and having a texture on a surface, and a protective film that is formed on the surface of the plating layer, wherein, the protective film contains:

a binder resin, and a plurality of resin particles;

a surface of the protective film includes:

a flat portion, and a plurality of convex portions formed by a part of a plurality of the resin particles protruding from the flat portion;

an average film thickness d of the protective film is 10.0 μm or less;

a total area fraction S of a plurality of the convex portions when the surface of the protective film is seen in plan view is 10.0% or less;

F1 defined by Formula (1) is 10.0 or more; and

F2 defined by Formula (2) is 0.7 to 3.0;

$$F1 = D \times S \quad (1)$$

$$F2 = D/d \quad (2)$$

where, in Formula (1) and Formula (2), an average particle diameter D (μm) of a plurality of the resin particles is substituted for "D", the total area fraction S (%) of a plurality of the convex portions is substituted for "S", and the average film thickness d (μm) of the protective film is substituted for "d".

[2]

The plated steel sheet according to [1], further including:

one or more inner organic resin layers laminated between the protective film and the plating layer.

[3]

The plated steel sheet according to [1] or [2], further including:

a chemical treatment coating that is arranged between the plating layer and the protective film, and that is formed in contact with the surface of the plating layer.

Hereunder, the plated steel sheet of the present embodiment is described in detail.

[Regarding Plated Steel Sheet 1]

Figure 3:
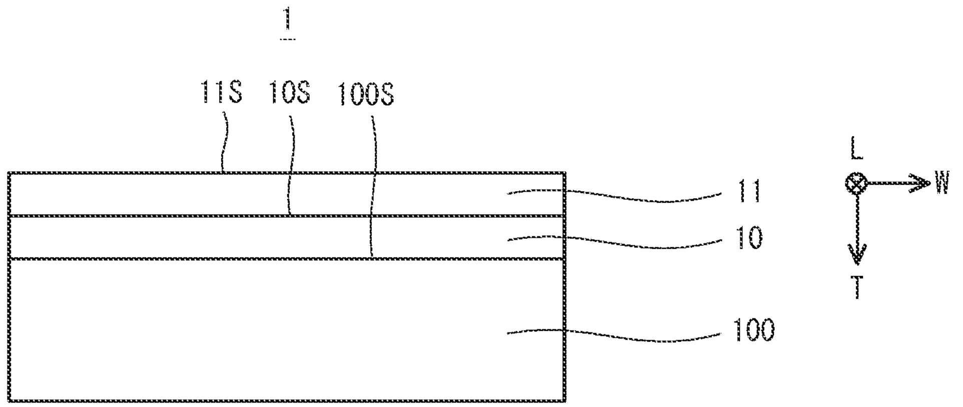
FIG. 3 is a cross-sectional view of a plated steel sheet of the present embodiment.

FIG. 3 is a cross-sectional view of a plated steel sheet 1 of the present embodiment. In FIG. 3, the rolling direction of the plated steel sheet 1 is defined as "L direction". The thickness direction of the plated steel sheet 1 is defined as "T direction". In the plated steel sheet 1, a direction that is perpendicular to the L direction and the T direction (that is, the width direction of the plated steel sheet 1) is defined as "W direction".

Referring to FIG. 3, the plated steel sheet 1 of the present embodiment includes a base-metal steel sheet 100, a plating layer 10, and a protective film 11. The plating layer 10 is formed on a surface 100S of the base-metal steel sheet 100. The protective film 11 is formed on a surface 10S of the plating layer 10. Thus, the plating layer 10 is arranged between the base-metal steel sheet 100 and the protective film 11.

Hereunder, the base-metal steel sheet 100, the plating layer 10, and the protective film 11 are described.

[Regarding Base-Metal Steel Sheet 100]

As the base-metal steel sheet 100, it suffices to use a known steel sheet that is applicable to a known plated steel sheet according to each mechanical property (for example, tensile strength, workability and the like) required for the plated steel sheet 1. In other words, the steel grade of the base-metal steel sheet 100 is not particularly limited. For example, as the base-metal steel sheet 100, a steel sheet for building materials may be used, a steel sheet for automobile exterior panels may be used, or a steel sheet for electrical machinery and apparatuses may be used. The base-metal steel sheet 100 may be a hot-rolled steel sheet, or may be a cold-rolled steel sheet.

[Regarding Plating Layer 10]

The plating layer 10 is formed on the surface 100S of the base-metal steel sheet 100. The plating layer 10 is in contact with the surface 100S of the base-metal steel sheet 100. The plating layer 10 is arranged between the base-metal steel sheet 100 and the protective film 11.

The type of plating of the plating layer 10 is not particularly limited. The plating layer 10 may be a plating layer composed of a zinc plating, or may be a plating layer composed of a zinc alloy plating. The plating layer 10 may be a plating layer composed of an Al plating, or may be a plating layer composed of an Al alloy plating. The plating layer 10 may be a plating layer composed of a metal plating or an alloy plating other than a plating that is mainly composed of zinc or a plating that is mainly composed of Al.

In a case where the plating layer 10 is a galvanized layer, the plating layer 10 is formed by a well-known galvanizing treatment process. Specifically, the plating layer 10 is formed, for example, by a plating process that is either one of an electroplating process and a hot-dip plating process. In the present description, the term "galvanized layer" also includes a zinc alloy plating layer. More specifically, the term "galvanized layer" is a concept that includes an electrogalvanized layer, an electrolytic zinc alloy-plated layer, a hot-dip galvanized layer, and a galvannealed layer.

In a case where the plating layer 10 is a galvanized layer, it suffices for the galvanized layer to have a well-known chemical composition. The content of Zn in the chemical composition of the galvanized layer is 65% or more by mass. If the content of Zn is 65% or more by mass, a sacrificial protection function will be markedly exhibited, and the corrosion resistance of the plated steel sheet 1 will markedly increase. A preferable lower limit of the content of Zn in the chemical composition of the galvanized layer is 70%, and more preferably is 80%.

The chemical composition of the galvanized layer preferably contains Zn and one or more elements selected from the group of elements consisting of Al, Co, Cr, Cu, Fe, Ni, P, Si, Sn, Mg, Mn, Mo, V, W, and Zr. In addition, the chemical composition in a case where the galvanized layer is an electrogalvanized layer further preferably contains one or more elements selected from the group of elements consisting of Fe, Ni, and Co in a total amount of 5 to 20% by mass. Furthermore, the chemical composition of the galvanized layer in a case where the galvanized layer is a hot-dip galvanized layer further preferably contains one or more elements selected from the group consisting of Mg, Al, and Si in a total amount of 5 to 20% by mass. In these cases, the galvanized layer exhibits further excellent corrosion resistance.

The galvanized layer may contain impurities. Here, the term "impurities" refers to substances that are unintentionally mixed into the raw material or which are unintentionally mixed in during the production process. Examples of impurities include Ti, B, S, N, C, Nb, Pb, Cd, Ca, Pb, Y, La, Ce, Sr, Sb, O, F, Cl, Zr, Ag, H and the like. In the chemical composition of the galvanized layer, the total content of impurities is preferably 1% or less.

The chemical composition of the galvanized layer can be measured, for example, by the following method. The protective film 11 of the plated steel sheet 1 is removed with a solvent that does not dissolve the galvanized layer or with a stripping agent such as a remover (for example, Neorever S-701: manufactured by Sansai Kako Co., Ltd.). Thereafter, the galvanized layer is dissolved using hydrochloric acid containing an inhibitor. The solution is subjected to ICP (inductively coupled plasma) analysis using an ICP emission spectrophotometer to determine the content of Zn. If the determined content of Zn is 65% or more by mass, it is determined that the plating layer 10 that is the object of the measurement is a galvanized layer.

[Regarding Texture Formed on Surface 10S of Plating Layer 10]

Figure 4:
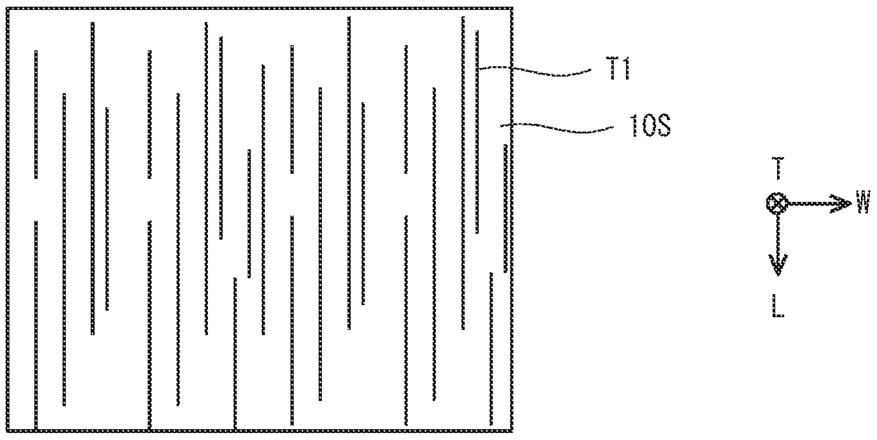
FIG. 4 is a plan view of a plating layer in FIG. 3.

FIG. 4 is a plan view of the plating layer 10 in FIG. 3. Referring to FIG. 4, when the plating layer 10 of the plated steel sheet 1 is seen in plan view, that is, when the plating layer 10 of the plated steel sheet 1 is viewed from above the plating layer 10, the plating layer 10 has a texture T1 on the surface 10S.

As used in the present description, the term "texture" means a concavo-convex pattern that is formed on the surface of the plating layer 10 by a physical or chemical technique. In FIG. 4, hairlines are illustrated as the texture T1. However, the texture T1 is not limited to hairlines. The texture T1 may be, for example, an embossed pattern, a vibration finish, a satin (blast) finish, a hammered pattern finish, a fabric (satin) finish or the like. Preferably, the texture T1 is hairlines.

[Regarding Coating Mass of Plating Layer 10]

The coating mass of the plating layer 10 is not particularly limited, and it suffices that it is a well-known coating mass. A preferable coating mass of the plating layer 10 is 5.0 to 120.0 g/m$^2$. If the coating mass of the plating layer 10 is 5.0 g/m$^2$ or more, in a case where a texture to be described later is imparted to the plating layer 10, exposure of ferrite (the base-metal steel sheet 100) can be suppressed. A more preferable lower limit of the coating mass of the plating layer 10 is 7.0 g/m$^2$, and further preferably is 10.0 g/m$^2$. The upper limit of the coating mass of the plating layer 10 is not particularly limited. From the viewpoint of economic efficiency, in a case where the plating layer 10 is formed by an electroplating process, a preferable upper limit of the coating mass is 40.0 g/m$^2$, a more preferable upper limit is 35.0 g/m$^2$, and further preferably is 30.0 g/m$^2$.

[Regarding Protective Film 11]

Figure 5:
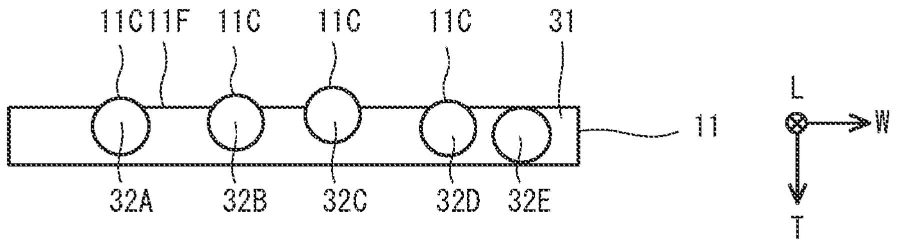
FIG. 5 is an enlarged view of a protective film in FIG. 3.
Figure 6:
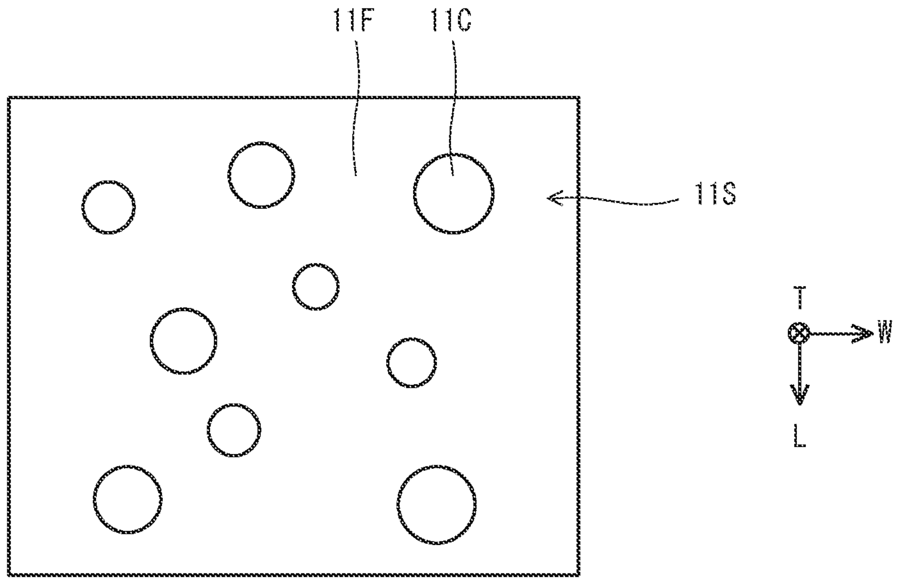
FIG. 6 is a plan view of the protective film in FIG. 3.

The protective film 11 is formed on the surface 10S of the plating layer 10. In FIG. 3, the protective film 11 is in contact with the surface 10S of the plating layer 10. FIG. 5 is an enlarged view of the protective film 11 illustrated in FIG. 3. FIG. 6 is a plan view of the protective film 11. Referring to FIG. 5 and FIG. 6, the protective film 11 includes a binder resin 31 and a plurality of resin particles 32 (32A to 32E).

A surface 11S of the protective film 11 includes a flat portion 11F and a plurality of convex portions 11C.

Among the plurality of resin particles 32, with respect to each of the resin particles 32A to 32D, a part of the resin particle 32 protrudes from the flat portion 11F, and the remainder is embedded in the binder resin 31. The convex portion 11C is formed by the part of the resin particle 32 that protrudes from the flat portion 11F.

Note that, among the plurality of resin particles 32 (32A to 32E), the entire resin particle 32E is embedded within the binder resin 31.

Figure 7A:
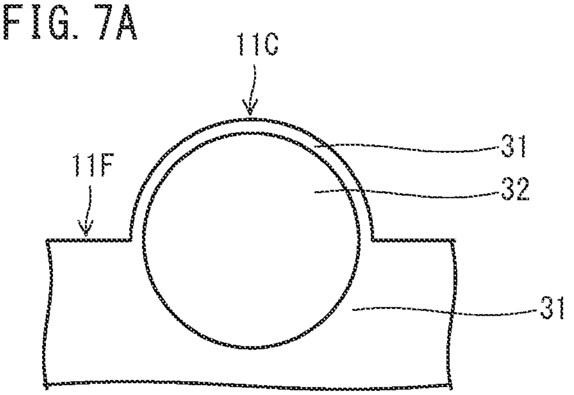
FIG. 7A is an enlarged view of a convex portion in FIG. 5.
Figure 7B:
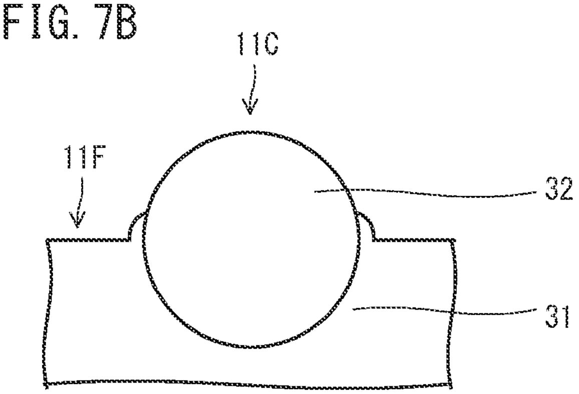
FIG. 7B is an enlarged view of a convex portion in FIG. 5, that is different to FIG. 7A.

The surface of the convex portion 11C may be constituted by the binder resin 31 as illustrated in FIG. 7A, or may be constituted by the resin particle 32 as illustrated in FIG. 7B. In a case where the surface of the convex portion 11C is constituted by the resin particle 32, as in FIG. 7B, one part of the resin particle 32 is in a state in which it is exposed from the binder resin 31.

The protective film 11 constituted as described above has excellent scratch resistance while also maintaining excellent texture visibility. Hereunder, the binder resin 31 and the resin particle 32 are described.

[Regarding Binder Resin 31]

The binder resin 31 functions as a binder that firmly fixes the resin particles 32. The binder resin 31 is composed of a resin that has translucency. Here, the phrase "has translucency" means that when the plated steel sheet 1 that includes the protective film 11 containing the binder resin 31 is placed in an environment equivalent to sunlight in the morning on a clear day (illuminance of about 65000 lux), the texture T1 formed on the surface 10S of the plating layer 10 can be visually recognized.

The binder resin 31 is not particularly limited as long as it is a resin that has translucency. A well-known natural resin and/or a well-known synthetic resin can be used as the binder resin 31. The binder resin 31 is, for example, one or more types selected from a group consisting of an epoxy-based resin, a urethane-based resin, a polyester-based resin, a phenol-based resin, a polyether sulfone-based resin, a melamine-alkyd-based resin, an acrylic-based resin, a polyamide-based resin, a polyimide-based resin, a silicone-based resin, a polyvinyl acetate-based resin, a polyolefin-based resin, a polystyrene-based resin, a vinyl chloride-based resin, and a polyvinyl acetate-based resin.

[Regarding Resin Particles 32]

As described above, in a plurality of the resin particles 32 (32A to 32D), one part of the resin particle 32 protrudes from the flat portion 11F, and the remainder of the resin particle 32 is embedded in the protective film 11. The convex portion 11C is formed by a portion where one part of the resin particle 32 protrudes from the flat portion 11F. Note that, in FIG. 5, among the plurality of resin particles, the entire resin particle 32E is embedded in the binder resin 31. However, the protective film 11 may include the resin particle 32E which is entirely embedded in the binder resin 31, or need not include the resin particle 32E.

The plurality of convex portions 11C that are formed by a part of each of a plurality of resin particles 32 protruding from the flat portion 11F enhance the scratch resistance of the plated steel sheet 1. Hereunder, the enhancement of the scratch resistance by the convex portions 11C is described.

In some cases, the plated steel sheet 1 is processed into a predetermined shape by processing that is typified by press working or the like. When performing press working or the like, the plated steel sheet 1 contacts with a die or the like and receives an external force from the die or the like. There is a possibility that scratches will be formed on the surface of the plated steel sheet 1 by contact with the die or the like.

The plurality of convex portions 11C protruding from the flat portion 11F suppress the occurrence of such scratches that are attributable to the die or the like. Specifically, of the entire surface 11S of the protective film 11 of the plated steel sheet 1, the convex portions 11C that protrude from the flat portion 11F are the portions that come into contact with the die or the like first during processing, and thereby inhibit contact between the flat portion 11F and the die or the like.

The resin particles 32 are harder than the binder resin 31. Alternatively, the resin particles 32 have a lower surface free energy and a lower coefficient of friction than the binder resin 31. Therefore, it is difficult for scratches to be imparted to the protective film 11 during working.

Further, in some cases the plated steel sheet 1 may be cut. In such a case, the cutting may generate burrs at end parts of the plated steel sheet 1 or may generate swarf such as iron powder. If such burrs or swarf collide or come into contact with the surface 11S of the protective film 11 of the plated steel sheet 1, there is a possibility that scratches will occur. Furthermore, there may also be cases where the plated steel sheet 1 is used indoors and/or outdoors as a building material. When the plated steel sheet 1 is used indoors, there is a possibility that the surface of the plated steel sheet 1 will collide or come into contact with furniture and fixtures or the like. Further, when the plated steel sheet 1 is used outdoors, there is a possibility that flying objects such as pebbles or pieces of metal will collide or come into contact with the surface of the plated steel sheet 1.

If colliding objects such as burrs, swarf, furniture and fixtures, flying objects or the like collide or come into contact with the surface of the plated steel sheet 1, these colliding objects are much more likely to come into contact with the convex portions 11C that protrude from the flat portion 11F first, rather than coming into contact with the flat portion 11F. As mentioned above, the resin particles 32 are harder or have a smaller coefficient of friction than the binder resin 31. Consequently, the occurrence of scratches due to a collision or contact with furniture and fixtures or the like and flying objects or the like can be suppressed.

As described above, each resin particle 32 satisfies at least one of the following (configuration 1) and (configuration 2).

(Configuration 1) The hardness of the resin particle 32 is higher than the hardness of the binder resin 31.

(Configuration 2) The surface free energy of the resin particle 32 is lower than the surface free energy of the binder resin 31, and therefore the coefficient of friction of the resin particle 32 is lower than the coefficient of friction of the binder resin 31.

The resin particle 32 is not particularly limited as long as the resin particle 32 satisfies at least one of (configuration 1) and (configuration 2). The plurality of resin particles 32 contained in the protective film 11 are, for example, one type or more selected from the group consisting of urethane-based resin particles, acrylic-based resin particles, hard polyethylene-based resin particles, polyethylene-based resin particles, polypropylene-based resin particles, and PTFE (polytetrafluoroethylene) particles. Each resin particle 32 is composed of a resin of a different type to the resin of the binder resin 31. Further, preferably the specific gravity of the resin particle 32 is equal to or greater than the specific gravity of the binder resin 31. If the specific gravity of the resin particle 32 is equal to or greater than the specific gravity of the binder resin 31, in a case where the film thickness of the protective film 11 is more than half the particle diameter (diameter) of the resin particle 32, in the case of most of the resin particles 32, approximately one half or more of the resin particle 32 will be embedded in the binder resin 31. For example, in the case of the respective resin particles 32A to 32E in FIG. 5, approximately one half or more of each resin particle is embedded in the binder resin 31.

Note that, each resin particle 32 is composed of a resin that does not melt even when baking is performed in a protective film formation process to be described later.

[Regarding Characteristic 1 to Characteristic 4]

The plated steel sheet 1 of the present embodiment also satisfies the following characteristic 1 to characteristic 4.

(Characteristic 1) An average film thickness d of protective film is 10.0 μm or less.

(Characteristic 2) A total area fraction S of convex portions is 10.0% or less.

(Characteristic 3) F1 defined by Formula (1) is 10.0 or more.

(Characteristic 4) F2 defined by Formula (2) is 0.7 to 3.0.

$$F1 = D \times S \quad (1)$$

$$F2 = D/d \quad (2)$$

where, in Formula (1) and Formula (2), the average particle diameter D (μm) of the resin particles is substituted for "D", the total area fraction S (%) of the convex portions is substituted for "S", and the average film thickness d (μm) of the protective film is substituted for "d".

Hereunder, characteristic 1 to characteristic 4 are described.

[(Characteristic 1) Regarding Average Film Thickness d of Protective Film 11]

In the plated steel sheet 1 of the present embodiment, an average film thickness d of the protective film 11 is 10.0 μm or less.

If the average film thickness d of the protective film 11 is more than 10.0 μm, smoothing (leveling) at only the protective film 11 will be liable to occur. Therefore, a difference between the impression of the reflection on the surface of the protective film 11 and the impression of the texture T1 that can be visually recognized will become large. In such case, the metallic feeling of the plated steel sheet 1 will decrease.

If the average film thickness d of the protective film 11 is 10.0 μm or less, the texture T1 formed on the surface 10S of the plating layer 10 will be sufficiently visible through the protective film 11, and the metallic feeling will also be sufficiently enhanced.

A preferable upper limit of the average film thickness d of the protective film 11 is 9.0 μm, and more preferably is 8.0 μm.

A preferable lower limit of the average film thickness d of the protective film 11 is 0.5 μm. If the average film thickness d of the protective film 11 is 0.5 μm or more, the corrosion resistance will be further enhanced. A preferable lower limit of the average film thickness d of the protective film 11 is 0.7 μm, more preferably is 1.0 μm, and further preferably is 2.0 μm.

[Method for Measuring Average Film Thickness d of Protective Film 11]

The average film thickness d of the protective film 11 can be measured by the following method.

A sample having a cross section orthogonal to the L direction of the plated steel sheet 1 (that is, a cross section that includes the T direction and the W direction) on a surface thereof is extracted. Among the surfaces of the sample, a cross section orthogonal to the L direction of the plated steel sheet 1 is adopted as an observation surface. On the observation surface, an observation visual field with a length range of 100 μm in the W direction of the plated steel sheet 1, that includes the protective film 11, is observed with a backscattered electron image (BSE) at a magnification of 2000× using a scanning electron microscope (SEM).

In the observation with the backscattered electron image (BSE) of the scanning electron microscope (SEM), it is possible to easily distinguish between the base-metal steel sheet 100, the plating layer 10, and the protective film 11 based on the contrast. In the observation visual field, the film thickness of the protective film 11 is measured at a pitch of 10 μm in the W direction (that is, the film thickness is to be measured at a total of 11 places). The arithmetic average value of the measured film thicknesses is determined.

The arithmetic average value of the film thickness is determined by the method described above in an arbitrary five observation visual fields on the observation surface. Of the determined five film thicknesses, the arithmetic average value of three film thicknesses that exclude the largest film thickness and the second largest film thickness is defined as the average film thickness d (μm) of the protective film 11.

[(Characteristic 2) Regarding Total Area Fraction S of Convex Portions in Plan View]

Referring to FIG. 6, a case where the surface 11S of the plated steel sheet 1 is seen in plan view will be assumed. In this case, the total area fraction of the convex portions 11C at the surface 11S of the protective film 11 is defined as the convex portions total area fraction S (%). In this case, in the plated steel sheet 1 of the present embodiment, the convex portions total area fraction S is 10.0% or less.

There is a negative correlation between the convex portions total area fraction S and the visibility of the texture T1. Referring to FIG. 1, as the convex portions total area fraction S increases, the glossiness decreases. That is, the larger the convex portions total area fraction S is, the greater the degree to which the visibility of the texture T1 decreases. Note that, even if the average particle diameter D of the resin particles 32 increases, the influence on the glossiness is extremely small. Therefore, even if the average particle diameter D of the resin particles 32 increases, the influence on the texture visibility is extremely small.

If the glossiness is 55% or more, the texture T1 can be sufficiently visually recognized. Referring to FIG. 1, when the convex portions total area fraction S is 10.0% or less, the glossiness is 55% or more. Therefore, in the plated steel sheet 1, the texture T1 can be sufficiently visually recognized. Therefore, the convex portions total area fraction S is to be 10.0% or less.

A preferable upper limit of the convex portions total area fraction S is 9.0%, more preferably is 8.0%, further preferably is 7.0%, further preferably is 6.0%, further preferably is 5.0%, and further preferably is 4.0%.

From the viewpoint of the visibility of the texture T1, the convex portions total area fraction S is preferably as small as possible. However, in order to increase the scratch resistance, the convex portions total area fraction S is required to a certain extent. Therefore, a preferable lower limit of the convex portions total area fraction S is 1.0%, and more preferably is 1.5%.

[Method for Measuring Convex Portions Total Area Fraction S]

The convex portions total area fraction S can be determined by the following method.

A sample is taken from a position at the center of the width of the plated steel sheet 1. Although the size of the sample is not particularly limited, the sample is to be a size such that an observation visual field having a size of 1000 μm×1000 μm can be secured at least at five places on the protective film 11.

Observation visual fields are selected at an arbitrary five places on the surface 11S of the protective film 11 of the sample. In each observation region, convex portions 11C in the surface 11S of the protective film 11 are identified. Identification of the convex portions 11C is performed by the following method.

The surface 11S of the sample is subjected to carbon vapor deposition or gold vapor deposition. The unevenness of the sample surface after vapor deposition is measured using a laser microscope. Specifically, a laser microscope having a height resolution of 0.01 μm or more is used. In the measured unevenness of the surface, a region which has a height difference of 0.1 μm or more with respect to an adjacent concave portion (corresponds to an edge region of a convex portion) is identified as a "convex portion". Convex portions can be identified by performing image analysis of the sample surface. By subjecting the surface 11S of the sample to carbon vapor deposition or gold vapor deposition, the convex shape of the convex portion 11C can be more clearly distinguished.

The total area fraction of convex portions (%) in each observation visual field is determined based on the total area of the convex portions 11C identified and the area of the observation visual field. The arithmetic average value of the total area fraction of convex portions at the five places is defined as the convex portions total area fraction S (%).

[(Characteristic 3) Regarding F1]

In the plated steel sheet 1 of the present embodiment, in addition, F1 defined by Formula (1) is 10.0 or more.

$$F1 = D \times S \tag{1}$$

where, in Formula (1), the average particle diameter D (μm) of a plurality of the resin particles 32 is substituted for "D", and the convex portions total area fraction S (%) is substituted for "S".

F1 is an index relating to the scratch resistance of the plated steel sheet 1. Referring to FIG. 2, in the plated steel sheet 1 in which F2 is 0.7 to 3.0, when F1 is less than 10.0, even if F1 increases, the scratch resistance remains low (remains at a scratch rating of 1). On the other hand, in the plated steel sheet 1 in which F2 is 0.7 to 3.0, when F1 is 10.0 or more, the scratch resistance markedly increases as F1 increases (the scratch rating markedly increases). Therefore, F1 is to be 10.0 or more.

A preferable lower limit of F1 is 13.0, more preferably is 14.0, further preferably is 15.0, further preferably is 15.5 or more, and further preferably is 16.0 or more. The upper limit of F1 is not particularly limited.

[(Characteristic 4) Regarding F2]

In the plated steel sheet 1 of the present embodiment, in addition, F2 defined by Formula (2) is 0.7 to 3.0.

$$F2 = D/d \tag{2}$$

where, in Formula (2), the average particle diameter D (μm) of a plurality of the resin particles 32 is substituted for "D", and the average film thickness d (μm) of the protective film 11 is substituted for "d".

F2 indicates the relation between the average particle diameter D of the resin particles 32 and the average film thickness d of the protective film 11. F2 is an index of the scratch resistance of the protective film 11.

When F2 is less than 0.7, the average particle diameter D of the resin particles 32 is too small relative to the average film thickness d of the protective film 11. In such case, the resin particles 32 cannot sufficiently form the convex portions 11C in the protective film 11. As a result, the scratch resistance of the plated steel sheet 1 decreases.

On the other hand, when F2 is more than 3.0, the average particle diameter D of the resin particles 32 is too large relative to the average film thickness d of the protective film 11. In such case, the resin particles 32 easily separate from the protective film 11. As a result, the scratch resistance of the plated steel sheet 1 decreases.

Therefore, F2 is to be 0.7 to 3.0.

A preferable lower limit of F2 is 0.8, more preferably is 0.9, and further preferably is 1.0.

A preferable upper limit of F2 is 2.8, more preferably is 2.6, and further preferably is 2.4.

[Method for Determining Average Particle Diameter D of Resin Particles 32]

The average particle diameter of the resin particles 32 in the protective film 11 can be determined by the following method.

Figure 7C:
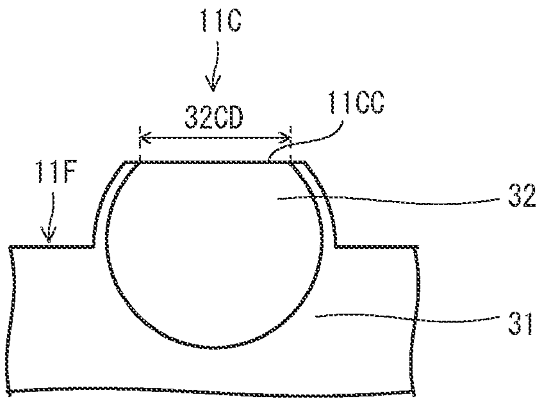
FIG. 7C is a schematic diagram for describing a method for measuring the particle diameter of a resin particle of a convex portion in FIG. 5.

The surface 11S of the protective film 11 is polished parallel to the flat portion 11F. By this polishing, as illustrated in FIG. 7C, the top portion of the convex portion 11C protruding from the flat portion 11F is polished, and a cross section 11CC that is parallel to the flat portion 11F is formed in the convex portion 11C.

Figure 7D:
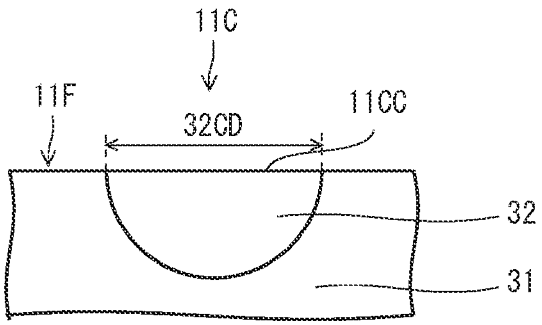
FIG. 7D is a schematic diagram for describing a method for measuring the particle diameter of a resin particle, which is a continuation of the description of FIG. 7C.

The cross section 11CC also includes a cross section of the resin particles 32. A particle diameter 32CD of the resin particle 32 at the cross section 11CC (hereunder, referred to as "resin particle diameter at the cross section 11CC") gradually increases each time polishing is repeated. Then, as illustrated in FIG. 7D, the resin particle diameter 32CD at the cross section 11CC eventually reaches the maximum value. This maximum value corresponds to the particle diameter (diameter) of the resin particle 32. When polishing is continued further, the resin particle diameter 32CD at the cross section 11CC decreases.

Therefore, an arbitrary convex portion 11C on the surface 11S of the protective film 11 is subjected to the aforementioned polishing parallel to the flat portion 11F. Further, the resin particle diameter 32CD at the cross section 11CC is measured each time polishing is performed by the method described above. Note that, the resin particle diameter 32CD is measured by well-known image analysis. The depth (pitch) of the polishing performed each time is set to 0.05 μm. The maximum value of the resin particle diameter 32CD that is measured is taken as the particle diameter (μm) of the resin particle 32 at the convex portion 11C.

The particle diameter of the resin particle 32 is determined by the method described above at an arbitrary 50 convex portions 11C. The arithmetic average value of the obtained particle diameters of the resin particles 32 at the 50 convex portions 11C is defined as the average particle diameter D (μm) of the resin particles 32.

The polishing method is not particularly limited, and a known method can be adopted. For example, Cryo FIB-SEM (Cryo Scanning Electronscopy combined with Focused Ion Beam) is adopted as the polishing method. In Cryo FIB-SEM, the specimen temperature is set to approximately −100° C., and the specimen is processed (polished) with an ion beam. In this case, there is little damage caused to the coating by heat generated accompanying ion beam irradiation, and polishing in sub-nanometer units is possible. Therefore, the particle diameter of the resin particles 32 can be determined.

[Regarding Preferable Size of Average Particle Diameter D of Resin Particles 32]

The average particle diameter D of the resin particles 32 is not particularly limited.

A preferable upper limit of the average particle diameter D of the resin particles 32 is 10.0 μm. A case will be assumed in which the average particle diameter D of the resin particles 32 is 10.0 μm, Formula (1) and Formula (2) are satisfied, and in addition, the diameter of the convex portions 11C in plan view of the surface 11S is 10.0 μm. When the average particle diameter D of the resin particles 32 is 10.0 μm and the diameter of the convex portions 11C is 10.0 μm, the diameter of the convex portions 11C is substantially the maximum diameter. In such case, the number density per 10000 $\mu m^2$ (particles/10000 $\mu m^2$) of the resin particles 32 constituting the convex portions 11C is 0.6 particles/10000 $\mu m^2$. Therefore, if the resin particles 32 constituting the convex portions 11C were arranged in a matrix when the surface 11S of the protective film 11 was seen in plan view, the average interval between adjacent convex portions 11C would be 125.0 μm, and the average interval between the convex portions 11C on a diagonal line would be 176.8 μm.

Among the aforementioned colliding objects such as burrs, swarf, furniture and fixtures or the like, and flying objects or the like, the tip diameter (diameter) of a colliding object that can form a scratch at the flat portion 11F of the protective film 11 is about 200 μm at minimum. If the average particle diameter D of the resin particles 32 is 10.0 μm, the average interval between the convex portions 11C will be less than 200 μm. Therefore, even in the case of a minute colliding object whose tip diameter (diameter) is about 200 μm, the colliding object will come into contact with the convex portions 11C, and it will be difficult for the colliding object to come into contact with the flat portion 11F. As a result, the occurrence of scratches can be suppressed even more effectively.

A preferable upper limit of the average particle diameter D of the resin particles 32 is 9.5 μm, more preferably is 9.0 μm, further preferably is 8.5 μm, further preferably is 8.0 μm, further preferably is 7.5 μm, and further preferably is 7.0 μm.

A preferable lower limit of the average particle diameter D of the resin particles 32 is 0.7 μm, more preferably is 1.0 μm, further preferably is 1.1 μm, and further preferably is 1.5 μm.

SUMMARY

As described above, the plated steel sheet 1 of the present embodiment has the following characteristics.

(Characteristic 1) The average film thickness d of the protective film 11 is 10.0 μm or less.

(Characteristic 2) The total area fraction S of the convex portions 11C is 10.0% or less.

(Characteristic 3) F1 defined by Formula (1) is 10.0 or more.

(Characteristic 4) F2 defined by Formula (2) is 0.7 to 3.0.

By having these characteristics, in the plated steel sheet 1 of the present embodiment, excellent visibility of the texture T1 and excellent scratch resistance can both be achieved.

Note that, the resin particles 32 in the protective film 11 are uniformly dispersed. For example, with respect to an observation visual field of 1000 μm×1000 μm on the surface of the protective film 11, when the observation visual field is divided into micro-sections of 100 μm×100 μm, the average number density of the resin particles 32 in each micro-section is 0.4 particles/10000 $\mu m^2$ or more, and the coefficient of variation that is determined based on the average number density in each micro-section and the standard deviation is 50.0% or less. A preferable average number density of the resin particles 32 in each micro-section is 0.6 particles/10000 $\mu m^2$ or more, and a preferable coefficient of variation is 40.0% or less.

[Another Configuration 1 of Plated Steel Sheet 1]

The protective film 11 of the plated steel sheet 1 that is described above is composed of one organic resin layer. However, one or more organic resin layers may be further laminated between the protective film 11 and the plating layer 10.

Figure 8:
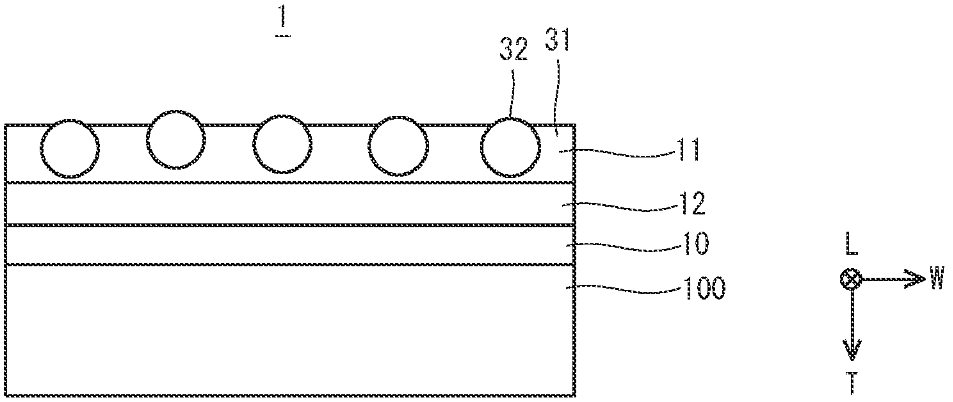
FIG. 8 is a cross-sectional view illustrating another example of a protective film of the plated steel sheet of the present embodiment.

FIG. 8 is a cross-sectional view illustrating another example of the plated steel sheet 1 of the present embodiment. Referring to FIG. 8, the plated steel sheet 1 includes the base-metal steel sheet 100, the plating layer 10, and the protective film 11, and further includes one or more inner organic resin layers 12. Although one inner organic resin layer 12 is arranged in the example in FIG. 8, a plurality of inner organic resin layers 12 may be arranged. The one or plurality of inner organic resin layers 12 are laminated between the protective film 11 and the plating layer 10.

The inner organic resin layer 12 is composed of the binder resin 31. That is, the inner organic resin layer 12 does not include the resin particles 32. The binder resin 31 of the inner organic resin layer 12 may be composed of a resin of the same type as the binder resin 31 constituting the protective film 11, or may be composed of a resin of a different type to the binder resin 31.

Even in a case where the protective film 11 is composed of a plurality of organic resin layers as described above, by satisfying the aforementioned characteristic 1 to characteristic 4, excellent visibility of the texture T1 and excellent scratch resistance can both be achieved.

Note that, in the plated steel sheet 1 illustrated in FIG. 8, a preferable total thickness of the protective film 11 and the inner organic resin layer 12 is 10.0 μm or less. In such case, the texture T1 formed on the surface 10S of the plating layer 10 is sufficiently visible through the protective film 11 and the inner organic resin layer 12, and a metallic feeling is also sufficiently enhanced.

[Another Configuration 2 of Plated Steel Sheet 1]

Figure 9:
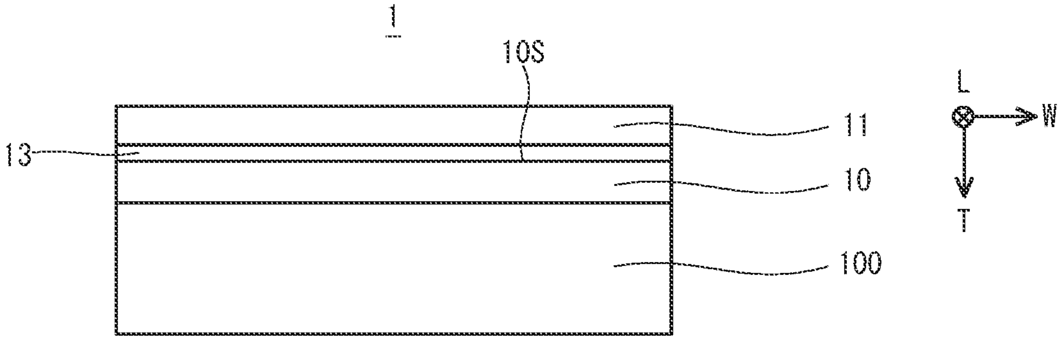
FIG. 9 is a cross-sectional view illustrating another example of the plated steel sheet of the present embodiment.

As illustrated in FIG. 9, in addition, the plated steel sheet 1 of the present embodiment may include a chemical treatment coating 13 between the plating layer 10 and the protective film 11. The chemical treatment coating 13 is formed in contact with the surface 10S of the plating layer 10. The chemical treatment coating 13 is a coating which has translucency. The chemical treatment coating 13, for example, is composed of an inorganic compound, or is composed of a mixture of an organic compound and an inorganic compound. The chemical treatment coating 13 is a thin coating that has an average film thickness of less than 1.0 μm.

When the plated steel sheet 1 includes the chemical treatment coating 13, the adhesion of the protective film 11 to the plating layer 10 increases. The chemical treatment coating 13 is, for example, a phosphate coating, an oxalate coating, a chromate coating, a lithium silicate coating, a silane coupling agent coating, or a coating in which an anti-rust component is contained in any of these coatings. The chemical treatment coating 13 is formed by a well-known chemical treatment.

Note that, one or more organic resin layers 12 may be formed between the protective film 11 and the chemical treatment coating 13. The protective film 11 and the organic resin layer 12 are each composed of the binder resin 31. Therefore, the adhesion of the protective film 11 to the organic resin layer 12 is high. The adhesion of the inner organic resin layer 12 to the plating layer 10 is enhanced by the chemical treatment coating 13. As a result, the adhesion of the protective film 11 to the plating layer 10 is enhanced.

[Production Method]

One example of a method for producing the plated steel sheet 1 of the present embodiment will now be described. The production method described hereunder is one example for producing the plated steel sheet 1 of the present embodiment. Accordingly, the plated steel sheet 1 composed as described above may be produced by a production method other than the production method described hereunder. However, the production method described hereunder is a preferable example of a method for producing the plated steel sheet 1 of the present embodiment.

The production method of the present embodiment includes the following processes.

(Step 1) Process of preparing base-metal steel sheet 100 (preparation process)

(Step 2) Process of forming plating layer 10 on base-metal steel sheet 100 (plating treatment process)

(Step 3) Process of forming texture T1 on plating layer 10 (texturing process)

(Step 4) Process of forming protective film 11 on plating layer 10 (film formation process)

Hereunder, each step is described.

[(Step 1) Preparation Process]

In the preparation process, the base-metal steel sheet 100 is prepared. As mentioned above, the base-metal steel sheet 100 may be a hot-rolled steel sheet or may be a cold-rolled steel sheet.

[(Step 2) Plating Treatment Process]

In the plating treatment process, the prepared base-metal steel sheet 100 is subjected to a well-known plating treatment to form the plating layer 10 on the surface of the base-metal steel sheet 100.

For example, in the case of forming the plating layer 10 to be composed of a zinc plating using a well-known electroplating process, it suffices to use a well-known bath for an electrogalvanizing bath or a zinc alloy electroplating bath. Examples of an electroplating bath include a sulfuric acid bath, a chloride bath, a zincate bath, a cyanide bath, a pyrophosphate bath, a boric acid bath, a citric acid bath, other complex baths, and a combination of these baths. The zinc alloy electroplating bath, for example, may contain ions of one or more kinds selected from the group consisting of Al, Co, Cr, Cu, Fe, Ni, P, Si, Sn, Mg, Mn, Mo, V, W, and Zr ions in addition to Zn ions.

In the electrogalvanizing treatment, it is possible to appropriately adjust the chemical composition, temperature, and flow rate of the electrogalvanizing bath or the zinc alloy electroplating bath as well as the conditions (current density, conduction pattern, and the like) during the plating treatment.

The thickness of the plating layer 10 formed in the electrogalvanizing treatment can be adjusted by adjusting the current density and the time when performing the electrogalvanizing treatment.

In the case of forming the plating layer 10 to be composed of a zinc plating by a hot-dip galvanizing treatment or a galvannealing treatment, a well-known zinc plating bath is prepared. The zinc plating bath, for example, is principally composed of Zn, and may contain one or more elements selected from the group consisting of Al, Co, Cr, Cu, Fe, Ni, P, Si, Sn, Mg, Mn, Mo, V, W, Zr.

In the case of forming a hot-dip galvanized layer as the plating layer 10, the base-metal steel sheet 100 is dipped in a zinc plating bath for which the bath temperature and the chemical composition of the bath have been adjusted, to thereby form the plating layer 10 (hot-dip galvanized layer) composed of a hot-dip galvanized coating on the surface of the base-metal steel sheet 100.

In the case of forming a galvannealed layer as the plating layer 10, the base-metal steel sheet 100 on which a hot-dip galvanized layer has been formed is subjected to a well-known heat treatment inside a well-known alloying furnace to form the plating layer 10 as a galvannealed layer.

The thickness of the plating layer 10 in the hot-dip galvanizing treatment can be adjusted by adjusting the speed at which the steel sheet is pulled up from the zinc plating bath and adjusting the amount of zinc plating that is removed by gas wiping.

A well-known degreasing treatment such as electrolytic degreasing may be performed on the base-metal steel sheet 100 prior to the plating treatment. The plated steel sheet 1 (hereunder, referred to as "intermediate plated steel sheet") including the base-metal steel sheet 100 and the plating layer 10 is produced by the above production process.

[(Step 3) Texturing Process]

In the texturing process, the surface 10S of the plating layer 10 of the intermediate plated steel sheet is subjected to well-known texturing to form the texture T1 on the surface 10S of the plating layer 10.

In a case where the texture T1 is to be hairlines, well-known hairline processing is performed. Examples of hairline processing methods include a method that forms hairlines by polishing the surface with a well-known abrasive belt, a method that forms hairlines by polishing the surface with a well-known abrasive brush, and a method that forms hairlines by transferring a hairline shape by rolling with a roll to which a hairline shape has been imparted. The length, depth and frequency of the hairlines can be adjusted by adjusting the grain size of a well-known abrasive belt, the grain size of a well-known abrasive brush, or the surface shape of a roll. Note that, as the method for imparting hairlines, it is preferable from the viewpoint of surface quality to form hairlines by polishing the surface with an abrasive belt or an abrasive brush.

An intermediate plated steel sheet which includes the base-metal steel sheet 100 and the plating layer 10, and in which the texture T1 is formed on the surface 10S of the plating layer 10 is produced by the above production process.

[(Step 4) Film Formation Process]

In the film formation process, the protective film 11 is formed on the surface 10S of the plating layer 10 of the intermediate plated steel sheet on which the texture Tl has been formed. The film formation process is described in detail hereunder.

First, a coating material to be used for forming the protective film 11 is prepared. The coating material contains a mixture of a liquid composition that will become the binder resin 31 when cured, and a plurality of resin particles 32.

A well-known method may be used as the method for forming the protective film 11 on the plating layer 10. For example, the aforementioned coating material is applied onto the surface 10S of the plating layer 10 by a spray method, a roll coater method, a curtain coater method, or a dipping and lifting method.

Thereafter, the coating material on the plating layer 10 is subjected to natural drying or to baking and drying to form the protective film 11. The drying temperature, drying time, baking temperature, and baking time can be adjusted as appropriate within well-known ranges.

F1 and F2 can be adjusted to within the aforementioned ranges by adjusting the mixing proportions of the liquid composition and the resin particles 32 in the coating material used to form the protective film 11, the size of the resin particles 32, and the film thickness of the protective film 11. Note that, in the case of forming one or more inner organic resin layers 12 between the protective film 11 and the plating layer 10, first the one or more inner organic resin layers 12 is formed by the method described above, and thereafter the protective film 11 is formed by the method described above.

Note that, a well-known chemical treatment process may be performed at a time that is after the texturing process and is before the protective film formation process. In such case, as illustrated in FIG. 9, the plated steel sheet 1 that includes the chemical treatment coating 13 between the plating layer 10 and the protective film 11 is produced.

The plated steel sheet 1 of the present embodiment can be produced by the above production process. Note that, the plated steel sheet 1 of the present embodiment is not limited to the production method described above, and as long as the plated steel sheet 1 composed as described above can be produced, the plated steel sheet 1 of the present embodiment may be produced by a production method other than the production method described above. However, the above production method is suitable for producing the plated steel sheet 1 of the present embodiment.

EXAMPLES

Hereunder, advantageous effects of one aspect of the present invention are described more specifically by way of examples. The conditions adopted in the examples described hereunder are one example of conditions adopted for confirming the feasibility and advantageous effects of the plated steel sheet 1 of the present embodiment. Therefore, the present invention is not limited to this example of conditions. Various conditions can be adopted for the present invention, as long as the objective of the present invention is achieved without departing from the gist of the present invention.

[Production of Plated Steel Sheet of Each Test Number]

Plated steel sheets of the test numbers described in Table 1 were prepared. The SPCC steel sheet defined in JIS G 3141:2017 was adopted as the base-metal steel sheet, and the thickness thereof was 0.6 mm.

TABLE 1

| | | | | | Convex Portions | | | | Evaluation Tests | | | |
|---|---|---|---|---|---|---|---|---|---|---|---|---|
| Test Number | Plating Type | Inner Organic Resin Layer | Chemical Treatment Coating | Average Film Thickness d (μm) | Total Area Fraction S (%) | Average Particle Diameter D (μm) | F1 | F2 | L-direction Glossiness (%) | Scratch Resistance Evaluation | Gw/Gl | Remarks |
| 1 | Zn | None | Yes | 1.1 | 3.8 | 3.0 | 11.4 | 2.7 | 77 | 2 | 0.75 | Inventive Example of Present Invention |
| 2 | Zn | None | Yes | 2.0 | 4.6 | 2.5 | 11.5 | 1.3 | 72 | 2 | 0.57 | Inventive Example of Present Invention |
| 3 | Zn | None | Yes | 3.1 | 6.4 | 2.5 | 16.0 | 0.8 | 70 | 3 | 0.46 | Inventive Example of Present Invention |
| 4 | Zn | None | Yes | 4.2 | 4.4 | 3.0 | 13.2 | 0.7 | 73 | 2 | 0.59 | Inventive Example of Present Invention |
| 5 | Zn | None | Yes | 5.9 | 1.9 | 6.0 | 11.4 | 1.0 | 82 | 2 | 0.63 | Inventive Example of Present Invention |
| 6 | Zn | None | Yes | 6.9 | 1.3 | 9.5 | 12.4 | 1.4 | 80 | 2 | 0.65 | Inventive Example of Present Invention |
| 7 | Zn | Yes | Yes | 8.2 | 1.1 | 9.5 | 10.5 | 1.2 | 83 | 2 | 0.76 | Inventive Example of Present Invention |
| 8 | Zn | None | Yes | 3.7 | 1.5 | 9.5 | 14.3 | 2.6 | 78 | 3 | 0.85 | Inventive Example of Present Invention |
| 9 | Zn-11% Ni | None | Yes | 4.1 | 4.2 | 4.0 | 16.8 | 1.0 | 75 | 4 | 0.48 | Inventive Example of Present Invention |
| 10 | Zn-11% Ni | None | Yes | 6.3 | 2.4 | 6.0 | 14.4 | 1.0 | 80 | 3 | 0.65 | Inventive Example of Present Invention |
| 11 | Zn-15% Fe | None | Yes | 3.9 | 2.8 | 6.0 | 16.8 | 1.5 | 79 | 4 | 0.56 | Inventive Example of Present Invention |
| 12 | Zn-15% Fe | None | Yes | 5.9 | 2.6 | 4.0 | 10.4 | 0.7 | 77 | 2 | 0.65 | Inventive Example of Present Invention |

TABLE 1-continued

| Test Number | Plating Type | Inner Organic Resin Layer | Chemical Treatment Coating | Average Film Thickness d (μm) | Convex Portions Total Area Fraction S (%) | Convex Portions Average Particle Diameter D (μm) | F1 | F2 | Evaluation Tests L-direction Glossiness (%) | Evaluation Tests Scratch Resistance Evaluation | Gw/Gl | Remarks |
|---|---|---|---|---|---|---|---|---|---|---|---|---|
| 13 | Zn-2% Co | None | Yes | 3.8 | 3.9 | 4.0 | 15.6 | 1.1 | 73 | 4 | 0.52 | Inventive Example of Present Invention |
| 14 | Zn-2% Co | None | Yes | 6.1 | 2.1 | 6.0 | 12.6 | 1.0 | 79 | 3 | 0.67 | Inventive Example of Present Invention |
| 15 | Zn | None | Yes | 3.2 | 4.1 | 4.0 | 16.4 | 1.3 | 74 | 4 | 0.49 | Inventive Example of Present Invention |
| 16 | Zn | None | Yes | 2.0 | 4.6 | 4.0 | 18.4 | 2.0 | 71 | 4 | 0.45 | Inventive Example of Present Invention |
| 17 | Zn | Yes | Yes | 3.3 | 1.7 | 9.5 | 16.2 | 2.9 | 82 | 4 | 0.48 | Inventive Example of Present Invention |
| 18 | Zn | None | Yes | 2.9 | 9.7 | 4.0 | 38.8 | 1.4 | 57 | 4 | 0.83 | Inventive Example of Present Invention |
| 19 | Zn | None | None | 4.1 | 2.2 | 6.0 | 13.2 | 1.5 | 80 | 4 | 0.62 | Inventive Example of Present Invention |
| 20 | Zn | None | Yes | 12.2 | 3.3 | 9.5 | 31.4 | 0.8 | 76 | 2 | 0.92 | Comparative Example |
| 21 | Zn | None | Yes | 16.4 | 0.7 | 9.5 | 6.7 | 0.6 | 93 | 1 | 0.95 | Comparative Example |
| 22 | Zn | None | Yes | 19.3 | 0.3 | 9.5 | 2.9 | 0.5 | 104 | 1 | 0.96 | Comparative Example |
| 23 | Zn | None | Yes | 3.0 | 10.4 | 4.0 | 41.6 | 1.3 | 53 | 4 | 0.92 | Comparative Example |
| 24 | Zn | None | Yes | 3.7 | 12.0 | 4.0 | 48.0 | 1.1 | 50 | 4 | 0.91 | Comparative Example |
| 25 | Zn | None | Yes | 3.8 | 16.0 | 4.0 | 64.0 | 1.1 | 46 | 4 | 0.91 | Comparative Example |
| 26 | Zn | None | Yes | 4.2 | 2.5 | 3.0 | 7.4 | 0.7 | 79 | 1 | 0.46 | Comparative Example |
| 27 | Zn | None | Yes | 3.7 | 3.1 | 3.0 | 9.3 | 0.8 | 75 | 1 | 0.52 | Comparative Example |
| 28 | Zn | None | Yes | 4.2 | 1.0 | 2.5 | 2.5 | 0.6 | 82 | 1 | 0.43 | Comparative Example |
| 29 | Zn | None | Yes | 4.1 | 1.2 | 1.0 | 1.2 | 0.2 | 81 | 1 | 0.51 | Comparative Example |
| 30 | Zn | None | Yes | 1.2 | 3.4 | 4.0 | 13.6 | 3.3 | 74 | 1 | 0.42 | Comparative Example |
| 31 | Zn | None | Yes | 2.0 | 2.2 | 9.5 | 20.9 | 4.8 | 82 | 1 | 0.41 | Comparative Example |

The base-metal steel sheet of each test number was subjected to a pretreatment for plating. Specifically, each base-metal steel sheet was subjected to electrolytic degreasing using a $Na_4SiO_4$ treatment solution with a concentration of 30 g/L under conditions of a treatment solution temperature of 60° C., a current density of 20 A/dm$^2$, and a treatment time of 10 seconds, and was then washed with water. After being subjected to the electrolytic degreasing and washing with water, each base-metal steel sheet was further immersed in an $H_2SO_4$ aqueous solution with a concentration of 50 g/L at 60° C. for 10 seconds, and then washed with water.

The base-metal steel sheets of the respective test numbers after the pretreatment for plating were subjected to the following plating treatments.

On the base-metal steel sheets of Test No. 1 to 8 and 15 to 31, a Zn plating layer was formed as a plating layer by the following method. Specifically, a plating bath at pH 2.0 containing 1.0 M of zinc sulfate heptahydrate and 50 g/L of anhydrous sodium sulfate was prepared. Using this plating bath, the plating time was adjusted so as to obtain a coating mass of 35 g/m$^2$ at a bath temperature of 50° C. and a current density of 50 A/dm$^2$. A Zn plating layer was formed by the above plating treatment.

On the base-metal steel sheets of Test Nos. 9 and 10, a Zn—Ni plating layer containing 11% of Ni by mass with the balance being Zn was formed by the following method. Specifically, a plating bath at pH 2.0 containing 1.2 M in total of zinc sulfate heptahydrate and nickel sulfate hexahydrate, and 50 g/L of anhydrous sodium sulfate was prepared. The zinc sulfate heptahydrate and nickel sulfate hexahydrate in the plating bath were adjusted so that the chemical composition of a Zn—Ni plating layer formed when a plating treatment was performed at a bath temperature of 50° C. and a current density of 50 A/dm$^2$ contained 11% of Ni by mass with the balance being Zn. Using the above plating bath, the plating time was adjusted so as to obtain a coating mass of 35 g/m$^2$ at a bath temperature of 50° C. and a current density of 50 A/dm$^2$. A Zn—Ni plating layer was formed by the above plating treatment.

On the base-metal steel sheets of Test Nos. 11 and 12, a Zn—Fe plating layer containing 15% of Fe by mass with the balance being Zn was formed by the following method. Specifically, a plating bath at pH 2.0 containing 1.2 M in total of zinc sulfate heptahydrate and Fe (II) sulfate heptahydrate, and 50 g/L of anhydrous sodium sulfate was prepared. The zinc sulfate heptahydrate and Fe (II) sulfate heptahydrate in the plating bath were adjusted so that the chemical composition of a Zn—Fe plating layer formed when a plating treatment was performed at a bath temperature of 50° C. and a current density of 50 A/dm$^2$ contained 15% of Fe by mass with the balance being Zn. Using the above plating bath, the plating time was adjusted so as to obtain a coating mass of 35 g/m$^2$ at a bath temperature of 50° C. and a current density of 50 A/dm$^2$. A Zn—Fe plating layer was formed by the above plating treatment.

On the base-metal steel sheets of Test Nos. 13 and 14, a Zn—Co plating layer containing 2% of Co by mass with the balance being Zn was formed by the following method. Specifically, a plating bath at pH 2.0 containing 1.2 M in total of zinc sulfate heptahydrate and cobalt sulfate heptahydrate, and 50 g/L of anhydrous sodium sulfate was prepared. The zinc sulfate heptahydrate and cobalt sulfate heptahydrate in the plating bath were adjusted so that the chemical composition of a Zn—Co plating layer formed when a plating treatment was performed at a bath temperature of 50° C. and a current density of 50 A/dm$^2$ contained 2% of Co by mass with the balance being Zn. Using the above plating bath, the plating time was adjusted so as to obtain a coating mass of 35 g/m$^2$ at a bath temperature of 50° C. and a current density of 50 A/dm$^2$. A Zn—Co plating layer was formed by the above plating treatment.

Hairlines were imparted to each of the base-metal steel sheets on which the plating layer was formed, along the L direction (rolling direction) of the base-metal steel sheet. The hairlines were formed by pressing abrasive papers of various grain sizes against the base metal steel sheet and adjusting the rolling force and the number of times of polishing.

A chemical treatment was performed on the base-metal steel sheets of Test Nos. 1 to 18 and 20 to 31 on which the plating layer had been formed, to thereby form a chemical treatment coating on the plating layer. Specifically, the following silane coupling agent A and silane coupling agent B were prepared.

Silane coupling agent A: 3-aminopropyltrimethoxysilane

Silane coupling agent B: 3-glycidoxypropyltrimethoxysilane

Silane coupling agent A and silane coupling agent B were added to water adjusted to pH 4 at a solid content mass ratio (silane coupling agent A/silane coupling agent B) of 1.0. Thereafter, the mixture was stirred for a predetermined time to produce an organosilicon compound. Phosphoric acid, which is a phosphate compound, was added to the produced organosilicon compound to produce a treatment solution.

The treatment solution was drawn up with a roller, and transferred onto the plating layer. At such time, the treatment solution was transferred onto the plating layer so as to achieve a coating mass of the chemical treatment coating of 0.3 g/m$^2$ after baking and drying.

Each steel sheet onto which the treatment solution had been transferred onto the plating layer was subjected to baking and drying. Specifically, each steel sheet onto which the treatment solution had been transferred onto the plating layer was loaded into a furnace maintained at 180° C., and the steel sheet was held inside the furnace until the temperature of the steel sheet reached 130° C. After the temperature of the steel sheet reached 130° C., the steel sheet was taken out from the furnace and air-cooled to normal temperature. A chemical treatment coating was formed on the plating layer by the above process. Note that, the steel sheet of Test No. 19 was not subjected to a chemical treatment. That is, a chemical treatment coating was not formed on the steel sheet of Test No. 19.

A protective film was formed on the steel sheets of Test Nos. 1 to 18 and 20 to 31 on which a chemical treatment coating was formed, and on the steel sheet of Test No. 19 on which a chemical treatment coating was not formed. A urethane-based resin (trade name: HUX-232, manufactured by ADEKA Corporation) was used as the binder resin for the protective film. Polyethylene-based resin particles (trade name: Chemipearl, manufactured by Mitsui Chemicals, Inc.) were used as the resin particles. A plurality of coating materials having various resin particle concentrations were prepared by dispersing the aforementioned binder resin and resin particles in water.

The prepared coating material was drawn up with a roll, and transferred onto the steel sheet. At such time, the coating mass of the coating material was adjusted so that the average film thickness of the protective film after baking and drying became the average film thickness d described in Table 1. The steel sheet onto which the coating material had been transferred was loaded into a furnace that was maintained at 250° C. The steel sheet was held inside the furnace until the temperature of the steel sheet reached 180° C. After the temperature of the steel sheet reached 180° C., the steel sheet was taken out from the furnace and air-cooled to normal temperature. A protective film was formed by the above process. Note that, in Test Nos. 7 and 17, a protective film and one inner organic resin layer were formed. The aforementioned urethane-based resin was used as the binder resin for each of the protective film and the inner organic resin layer. The inner organic resin layer did not contain resin particles. The protective film contained the aforementioned polyethylene resin particles as resin particles. In Test Nos. 7 and 17, first, after transferring a coating material onto the steel sheet by the method described above, and baking and drying were then performed to form an inner organic resin layer. Thereafter, a coating material was transferred onto the steel sheet by the method described above, and baking and drying were then performed to form a protective film. The plated steel sheet of each test number was produced by the above production process.

[Evaluation Tests]

The produced plated steel sheet of each test number was subjected to the following evaluation tests.

(Test 1) Test to measure average film thickness d of protective film (Test 2) Test to measure convex portions total area fraction S (Test 3) Test to measure average particle diameter D of resin particles (Test 4) Test to measure L-direction glossiness (Test 5) Scratch resistance evaluation test (Test 6) Metallic feeling evaluation test Hereunder, each test is described.

[(Test 1) Test to Measure Average Film Thickness d of Protective Film]

The average film thickness d (μm) of the protective film of the plated steel sheet of each test number was determined by the method described in the above "Method for measuring average film thickness d of protective film 11". The determined average film thicknesses d are shown in Table 1. Note that, the total film thickness of the protective film and the inner organic resin layer of Test No. 7 was 9.4 μm, and the total film thickness of the protective film and the inner organic resin layer of Test No. 17 was 4.0 μm. Further, in Test Nos. 7 and 17, a layer containing resin particles was identified as a protective film, and a layer that did not contain resin particles was identified as an inner organic resin layer, and the film thickness of each layer (the protective film and the inner organic resin layer) was determined.

[(Test 2) Test to Measure Convex Portions Total Area Fraction S]

The convex portions total area fraction S (%) of the plated steel sheet of each test number was determined by the method described in the above [Method for measuring convex portions total area fraction S] using a laser microscope (trade name: VK-9710) manufactured by Keyence Corporation. The determined convex portions total area fractions S are shown in Table 1.

[(Test 3) Test to Measure Average Particle Diameter D of Resin Particles]

The average particle diameter D of the resin particles (μm) of the plated steel sheet of each test number was determined by the method described in the above [Method for determining average particle diameter D of resin particles 32]. The determined average particle diameters are shown in Table 1.

[(Test 4) Test to Measure L-Direction Glossiness]

The L-direction glossiness of the plated steel sheet of each test number was measured by the following method. Specifically, the glossiness (60° glossiness) at an incident angle of 60° in the L direction (extending direction of the hairlines) of the plated steel sheet was measured with a gloss meter by a method in conformity with Specular glossiness-Methods of measurement defined in JIS Z 8741:1997. A gloss meter (trade name: UGV-6P) manufactured by Suga Test Instruments Co. Ltd. was used as the gloss meter. The determined L-direction glossiness (%) is shown in Table 1.

[(Test 5) Scratch Resistance Evaluation Test]

The scratch resistance of the plated steel sheet of each test number was evaluated by the following method.

A test specimen including the protective film was taken from the plated steel sheet of each test number. The test specimen was mounted and fixed to a sample stage of a friction tester equipped with a diamond stylus having a tip diameter (diameter) of 180 μm. A friction tester with the trade name "Tribo Gear TYPE: 14FW" manufactured by Shinto Scientific Co., Ltd. was used as the friction tester.

The diamond stylus was brought into vertical contact with the surface of the protective film of the test specimen. In a state in which the diamond stylus was in contact with the surface of the protective film of the test specimen, the sample stage on which the test specimen was fixed was slid at a scratching speed of 60 mm/sec. At such time, the load applied to the diamond stylus was changed, and whether or not a scratch was present was visually checked. The scratch resistance of the protective film was evaluated as described below based on the load when the occurrence of a scratch was visually confirmed.

Scratch rating 1: Occurrence of a scratch was visually confirmed at a load of less than 30 gf Scratch rating 2: Occurrence of a scratch was visually confirmed at a load which was 30 gf or more and less than 50 gf Scratch rating 3: Occurrence of a scratch was visually confirmed at a load which was 50 gf or more and less than 70 gf Scratch rating 4: Occurrence of a scratch was visually confirmed at a load of 70 gf or more If the scratch rating was 2 or more, the relevant test specimen was evaluated as being excellent in scratch resistance.

[(Test 6) Metallic Feeling Evaluation Test]

The metallic feeling of the plated steel sheet of each test number was measured by the following method.

In accordance with JIS Z 8741:1997, a 60° glossiness Gl at an incident angle of 60° in the rolling direction L and a 60° glossiness Gw at an incident angle of 60° in the W direction (width direction) were measured with a gloss meter at arbitrary points on the plated steel sheet of each test number. A gloss meter (trade name: UGV-6P) manufactured by Suga Test Instruments Co. Ltd. was used as the gloss meter. Gw/Gl was determined based on the obtained glossiness Gl and glossiness Gw.

If the texture could be visually recognized and Gw/Gl≤0.90, it was determined that an excellent metallic feeling was obtained.

[Evaluation Results]

Referring to Table 1, in the plated steel sheet of each of Test Nos. 1 to 19, the average film thickness d of the protective film was 10.0 μm or less. In addition, the convex portions total area fraction S was 10.0% or less. Further, F1 was 10.0 or more, and F2 was 0.7 to 3.0. As a result, the 60° glossiness in the L direction was 55% or more, and even when a protective film or chemical treatment coating was formed on the plating layer, the texture formed on the surface of the plating layer was visible, and the plated steel sheet was excellent in texture visibility. In addition, Gw/Gl was 0.90 or less, and an excellent metallic feeling was obtained. Furthermore, the scratch resistance evaluation for each of these plated steel sheets was a scratch rating of 2 or more, and thus excellent scratch resistance was obtained.

On the other hand, in Test No. 20 the average film thickness d of the protective film was more than 10.0 μm. Therefore, Gw/Gl was more than 0.90, and the metallic feeling was low.

In Test Nos. 21 and 22, the average film thickness d of the protective film was more than 10.0 μm. Therefore, Gw/Gl was more than 0.90, and the metallic feeling was low. In addition, F1 was less than 10.0, and F2 was less than 0.7. Therefore, the scratch resistance evaluation for each of these plated steel sheets was a scratch rating of 1, and thus the scratch resistance was low.

In Test Nos. 23 to 25, the convex portions total area fraction S was more than 10.0%. As a result, the 60° glossiness in the L direction was less than 55%, and the visibility of the texture formed on the surface of the plating layer was low.

In Test Nos. 26 and 27, F1 was less than 10.0. As a result, the scratch resistance evaluation for each of these plated steel sheets was a scratch rating of 1, and thus the scratch resistance was low.

In Test Nos. 28 and 29, F2 was less than 0.7. Therefore, F1 also was less than 10.0. As a result, the scratch resistance evaluation for each of these plated steel sheets was a scratch rating of 1, and thus the scratch resistance was low.

In Test Nos. 30 and 31, F2 was more than 3.0. As a result, the scratch resistance evaluation for each of these plated steel sheets was a scratch rating of 1, and thus the scratch resistance was low.

An embodiment of the present invention has been described above. However, the embodiment described above is merely an example for carrying out the present invention. Therefore, the present invention is not limited to the above-described embodiment, and can be implemented by appropriately modifying the above embodiment within a range that does not depart from the gist of the present invention.

REFERENCE SIGNS LIST

1 Plated Steel Sheet
10 Plating Layer
T1 Texture
11 Protective Film
31 Binder Resin
32 Resin Particle

The invention claimed is:

1. A plated steel sheet, comprising:
a base-metal steel sheet,
a plating layer formed on a surface of the base-metal steel sheet, and having a texture on a surface, and
a protective film that is formed on the surface of the plating layer,
wherein,
the protective film contains:
a binder resin, and
a plurality of resin particles having an average particle diameter of 10.0 μm or less;
a surface of the protective film includes:
a flat portion, and
a plurality of convex portions formed by a part of a plurality of the resin particles protruding from the flat portion;
an average film thickness d of the protective film is 10.0 μm or less;
a total area fraction S of a plurality of the convex portions when the surface of the protective film is seen in plan view is 10.0% or less;
F1 defined by Formula (1) is 10.0 or more; and
F2 defined by Formula (2) is 0.7 to 1.3;

$$F1 = D \times S \tag{1}$$

$$F2 = D/d \tag{2}$$

where, in Formula (1) and Formula (2), an average particle diameter D (μm) of a plurality of the resin particles is substituted for "D", the total area fraction S (%) of a plurality of the convex portions is substituted for "S", and the average film thickness d (μm) of the protective film is substituted for "d".

2. The plated steel sheet according to claim 1, further comprising:
one or more inner organic resin layers laminated between the protective film and the plating layer.

3. The plated steel sheet according to claim 1, further comprising:
a chemical treatment coating that is arranged between the plating layer and the protective film, and that is formed in contact with the surface of the plating layer.

4. The plated steel sheet according to claim 2, further comprising:
a chemical treatment coating that is arranged between the plating layer and the protective film, and that is formed in contact with the surface of the plating layer.

* * * * *